(12) United States Patent
Elliott et al.

(10) Patent No.: US 9,162,856 B2
(45) Date of Patent: Oct. 20, 2015

(54) LIFTING DEVICE FOR VEHICLE WHEELS

(76) Inventors: Jeffrey Paul Elliott, Abrams, WI (US);
Paul George LaRock, Abrams, WI (US)

( * ) Notice: Subject to any disclaimer, the term of this patent is extended or adjusted under 35 U.S.C. 154(b) by 902 days.

(21) Appl. No.: 13/410,400

(22) Filed: Mar. 2, 2012

(65) Prior Publication Data
US 2013/0228729 A1 Sep. 5, 2013

(51) Int. Cl.
*B66F 9/00* (2006.01)
*B66F 3/08* (2006.01)
*B60P 3/077* (2006.01)
*B66F 3/36* (2006.01)
*B66F 3/44* (2006.01)

(52) U.S. Cl.
CPC . *B66F 3/08* (2013.01); *B60P 3/077* (2013.01); *B66F 3/36* (2013.01); *B66F 3/44* (2013.01)

(58) Field of Classification Search
USPC .......................................... 254/2 C
See application file for complete search history.

(56) References Cited

U.S. PATENT DOCUMENTS

| | | | |
|---|---|---|---|
| 3,434,607 A * | 3/1969 | Nelson | 414/563 |
| 4,088,303 A | 5/1978 | Aquila | |
| 4,483,549 A * | 11/1984 | Nikawa | 280/402 |
| 4,632,629 A * | 12/1986 | Kooima | 414/563 |
| 5,000,423 A | 3/1991 | Snickers | |
| 5,013,209 A * | 5/1991 | DeMichele et al. | 414/563 |
| 5,362,196 A | 11/1994 | Beattie et al. | |
| 5,575,606 A * | 11/1996 | Kiefer et al. | 414/563 |
| 5,716,188 A | 2/1998 | Pigeon | |
| 5,908,280 A * | 6/1999 | Allison | 414/563 |
| 5,909,996 A * | 6/1999 | Cowell | 414/563 |
| 5,954,160 A | 9/1999 | Wells, Sr. et al. | |
| 5,984,616 A * | 11/1999 | Youmans et al. | 414/563 |
| 6,302,419 B1 * | 10/2001 | Ito | 280/124.111 |
| 6,330,997 B2 | 12/2001 | McGlaun et al. | |
| 6,345,807 B1 * | 2/2002 | Cacciatore | 254/3 B |
| 6,692,218 B2 * | 2/2004 | Grile | 414/563 |
| 6,929,250 B2 | 8/2005 | Blake et al. | |
| 7,082,845 B2 * | 8/2006 | Simons | 73/862.382 |
| 7,188,856 B2 | 3/2007 | Maynard | |
| 7,204,475 B1 * | 4/2007 | Burry et al. | 254/88 |
| 7,278,627 B2 | 10/2007 | Jones | |
| 7,494,313 B2 * | 2/2009 | Craze | 414/563 |
| 8,337,135 B2 * | 12/2012 | Underwood | 414/426 |
| 8,387,953 B2 * | 3/2013 | Drake | 254/112 |
| 8,398,056 B1 * | 3/2013 | Morrison | 254/93 H |
| 8,944,220 B2 * | 2/2015 | Dowdy | 188/32 |
| 2005/0158162 A1 * | 7/2005 | Shubert | 414/563 |
| 2005/0253122 A1 * | 11/2005 | Jones | 254/88 |

* cited by examiner

*Primary Examiner* — Lee D Wilson
*Assistant Examiner* — Alvin Grant
(74) *Attorney, Agent, or Firm* — Steven H. Greenfield; Greenfield Invention and Patent Consulting, Inc.

(57) ABSTRACT

A device for lifting and holding the front or rear wheels of small to medium size and weight vehicles such as snow blowers, golf carts or lawn mowers is disclosed. The device contains two platform assemblies configured for wedging under the wheels of vehicles and a hoist configured for lifting the wheel to a desired height to provide access to the underside of the vehicle.

6 Claims, 6 Drawing Sheets

LIFTING DEVICE FOR VEHICLE WHEELS

RELATED APPLICATIONS

This application claims priority from provisional application No. 61/416,144 filed on Mar. 3, 2011.

FIELD OF THE INVENTION

The present invention relates to a device configured to lift the front or rear wheels of small to medium size and weight vehicles such as snow blowers, golf carts or lawn mowers.

BACKGROUND OF THE INVENTION

A large number of prior art references relating to devices for lifting the wheels of small vehicles have been identified. Vehicle towing embodiments are also related to the present invention since towing also involves raising the front wheels of the automobiles and securing them against falling out or moving.

Many of the prior art devices provide means for towing that require more lengthy and complex setup steps than to simply lift the vehicle wheels. A key difference between the lifting devices of the prior art references is the use of incline ramps for bracing and transporting the wheels of the vehicle.

U.S. Pat. No. 3,434,607 is directed to an improvement in an automobile towing device which includes a support means for rigid attachment to the rear of the towing vehicle and receiving means for receiving a part of a towed vehicle, the receiving means includes a rotatable member.

U.S. Pat. No. 4,088,303 is for a repositionable lift apparatus constructed of a boom pivoted at one end near the upper end of a post. The other end of the boom pivotally supports a platform and a power cylinder is provided to pivot the boom to raise its other end from a loading position to a working position.

U.S. Pat. No. 4,632,629 describes a wheel lift towing apparatus for mounting on the rear end of a tow truck or other towing vehicle for engaging the wheels of an immobilized vehicle to be towed. A rearwardly extending boom assembly is mounted at the rear end of the tow truck. Wheel lift carriages are mounted on the free end of the boom assembly for engaging the wheels of the immobilized vehicle for lifting the vehicle.

U.S. Pat. No. 5,000,423 provides for a lift for raising or tilting a small vehicle such as a riding lawn mower including first and second ramps. The ramps each include an angled portion connected to a horizontal portion in turn connected to a vertical portion. The ramps are held by legs which extend from the vertical portion and which in the preferred form are removably pivotably mounted for ease of assembly and storage.

U.S. Pat. No. 5,362,196 relates to lift forks for use in lifting equipment such as utility vehicles (e.g., three-wheeled commercial mowers, four-wheeled vehicles, outdoor power equipment, etc.) for inspection, servicing and repair purposes. The lift forks are attachable to tool bars.

U.S. Pat. No. 5,954,160 refers to a wheel engaging vehicle lift for raising a vehicle relative to the ground and for supporting the vehicle in a raised position includes first and second support columns standing vertically upward from the ground. A first carriage is movably attached to the first support column and a second carriage is movably attached to the second support column. A first pair of arms extend away from the first carriage and a second pair of arms extend away from the second carriage, wherein the first and second pairs of arms are each rotatable about a substantially vertical axis proximate to a first end of the arms. A wheel engaging adapter may be removably secured proximate to an opposite end of the first and second pairs of arms, wherein the adapters are each rotatable about a substantially vertical axis proximate to the second end. The structure of the invention enables a conventional two-post frame engaging lift to be easily and readily converted into a two-post wheel engaging vehicle lift, and vice versa.

U.S. Pat. No. 5,716,188 relates to a towing apparatus for towing a disabled automobile. The towing apparatus includes an elongated boom having at each end portion a large rectangular aperture. A generally L-shaped wheel support member is also provided, having an elongated arm and a transverse wheel retainer forming an arcuate sheet.

U.S. Pat. No. 6,330,997 is for a lifting apparatus for small vehicles, including a frame assembly, a pair of fabric webs attached to the frame assembly, and a pivotable lift assembly with a pair of spaced-apart wheel holders for receiving and securing the forward wheels of a vehicle such as a lawn or garden tractor, golf cart, or the like. To use the apparatus, the operator positions the wheels of the vehicle on the webs, operably positions the forward wheels in the wheel holders then drives the vehicle over the webs while the lift assembly pivots upwards.

U.S. Pat. No. 6,929,250 teaches a mobile appliance lift tool which includes a cart having a frame and a pair of legs. Each leg has a sleeve pivotally attaching the leg to an end of the frame. Each sleeve is adapted to travel up and down the leg to selectively move the frame between a substantially horizontal configuration and a substantially inclined configuration.

U.S. Pat. No. 7,188,856 is for an apparatus for towing at least one wheeled vehicle that includes a frame including at least one generally vertically oriented support member and at least one generally horizontally oriented support member, the horizontal support member being at least partially hollow and formed with a ramp in a distal end thereof; a mounting arrangement for selectively mounting the frame to a towing vehicle; a vehicle support assembly for receiving and holding a vehicle tire, including at least one generally curved forward tire support member mounted to the horizontal frame member, and a rear support assembly, the rear support assembly including a generally L-shaped frame and a generally curved aft tire support member for removable telescopic engagement with the horizontal support member; and a lifting assembly for moving the vehicle support assembly generally vertically between a first position for loading a vehicle and a second position for towing a vehicle.

U.S. Pat. No. 7,278,627 relates to a lift and support structure for a lawn tractor which includes a frame with a center lift member secured to and separating a pair of wheel support members. Ramps are secured to the wheel support members to permit the front or rear wheels of the lawn tractor to be rolled onto or off of the lift and support structure. The center lift member is elevated above the wheel support members to permit a floor jack or other lifting mechanisms to be placed under the lift and support structure.

SUMMARY OF THE PRESENT INVENTION

In one aspect of the present invention, a device for lifting two parallel vehicle wheels off a floor comprises: a first platform assembly and a second platform assembly, the first platform assembly and the second platform assembly each containing a flat plate, a front brace, a first side wall and a second side wall, wherein a rear portion of the first side wall comprises a notch and a rear portion of the second side wall comprises a notch, the flat plate having a uniform thickness; a support bar disposed in parallel with the floor, the first platform assembly and second platform assembly being attached to the support bar in a manner that the first platform assembly and second platform assembly are being configured for horizontal movement on the support bar, the first platform assembly and second platform assembly also being configured for positioning and repositioning on the support bar; the first platform assembly being adapted for containing only one vehicle wheel and the second platform assembly being adapted for containing only one vehicle wheel; the flat plate being configured for lifting and holding a vehicle wheel, the flat plate also being configured for wedging between the wheel and the floor, the wedging being accomplished by using sufficient force on the device as to insert the flat plate between the wheel and the floor; the notch being adapted to hold a barrier rod for preventing the wheel from shifting off the plate; a hoist member for lifting the support bar upward and lowering the support bar to the floor; and a power supply for the hoist member.

In another aspect of the present invention, a method for lifting two parallel vehicle wheels using the aforementioned device, the method comprises: maneuvering the device in a manner that the rear portion of the side walls face the wheels to be lifted; aligning each platform assembly in front of one wheel by moving the each platform horizontally on the support bar; pushing the device toward the wheels in a manner such that each flat plate is wedged underneath its corresponding wheel; placing each barrier rod in the respective notch on the rear end of the first side wall and second side wall of each platform assembly; and activating the hoist to lift the platform assemblies along with the wheels to a desired height.

These and other features, aspects and advantages of the present invention will become better understood with reference to the following drawings, description and claims.

DETAILED DESCRIPTION OF THE INVENTION

Figure 1:
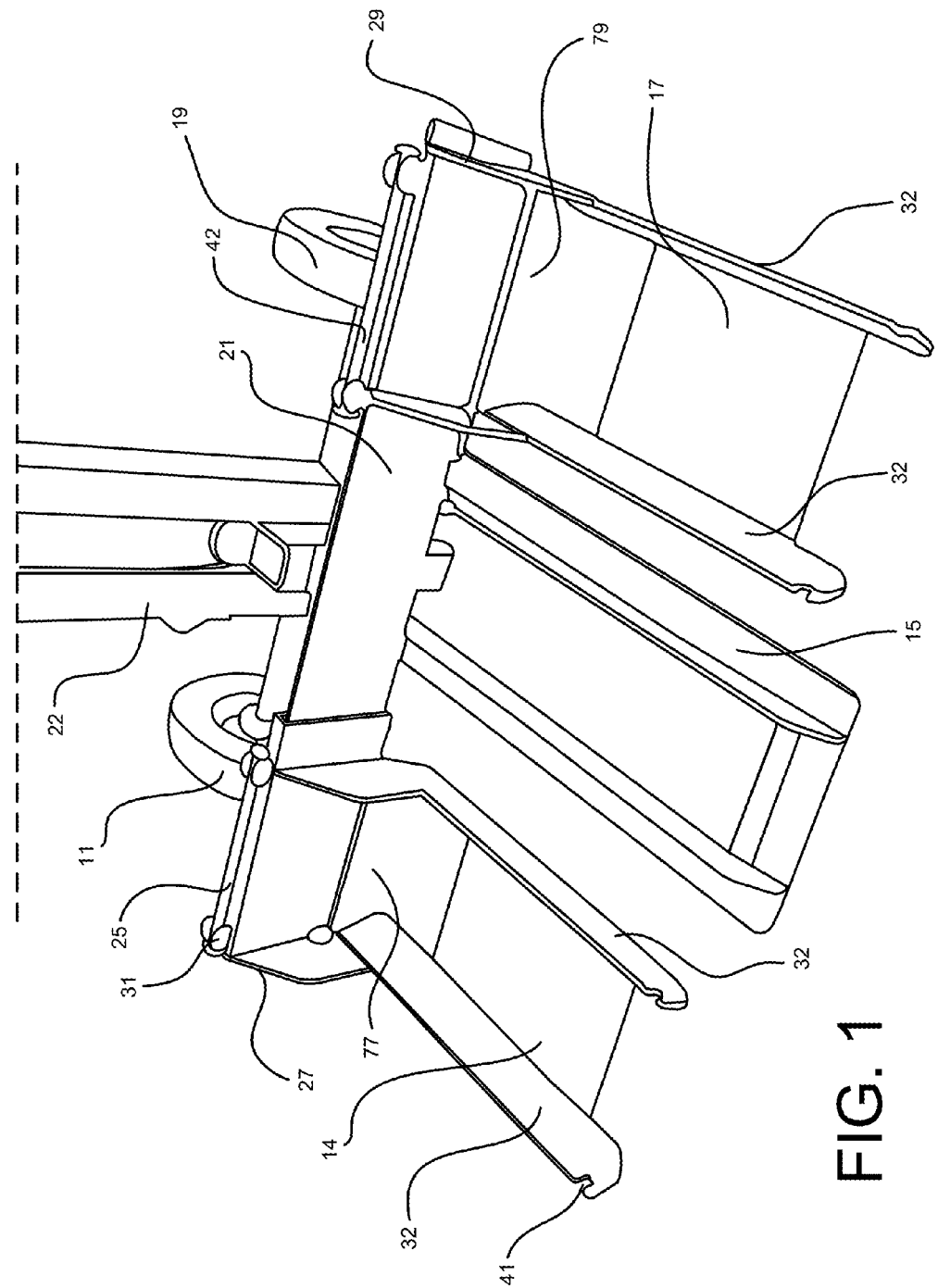
FIG. 1 is a front view of the lifting device according to an embodiment of the present invention.
Figure 2:
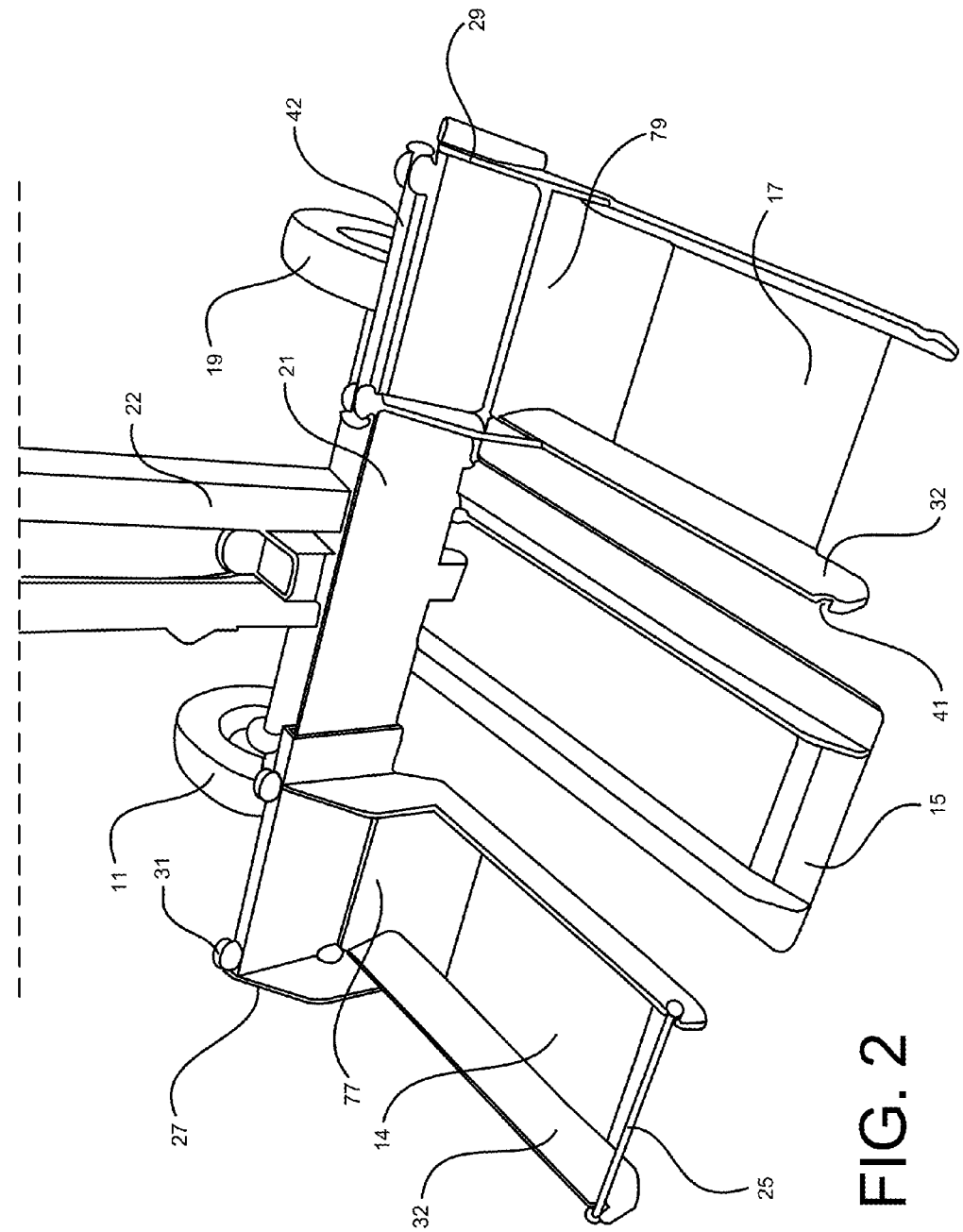
FIG. 2 is another front view of the lifting device in according to an embodiment of the present invention.
Figure 3:
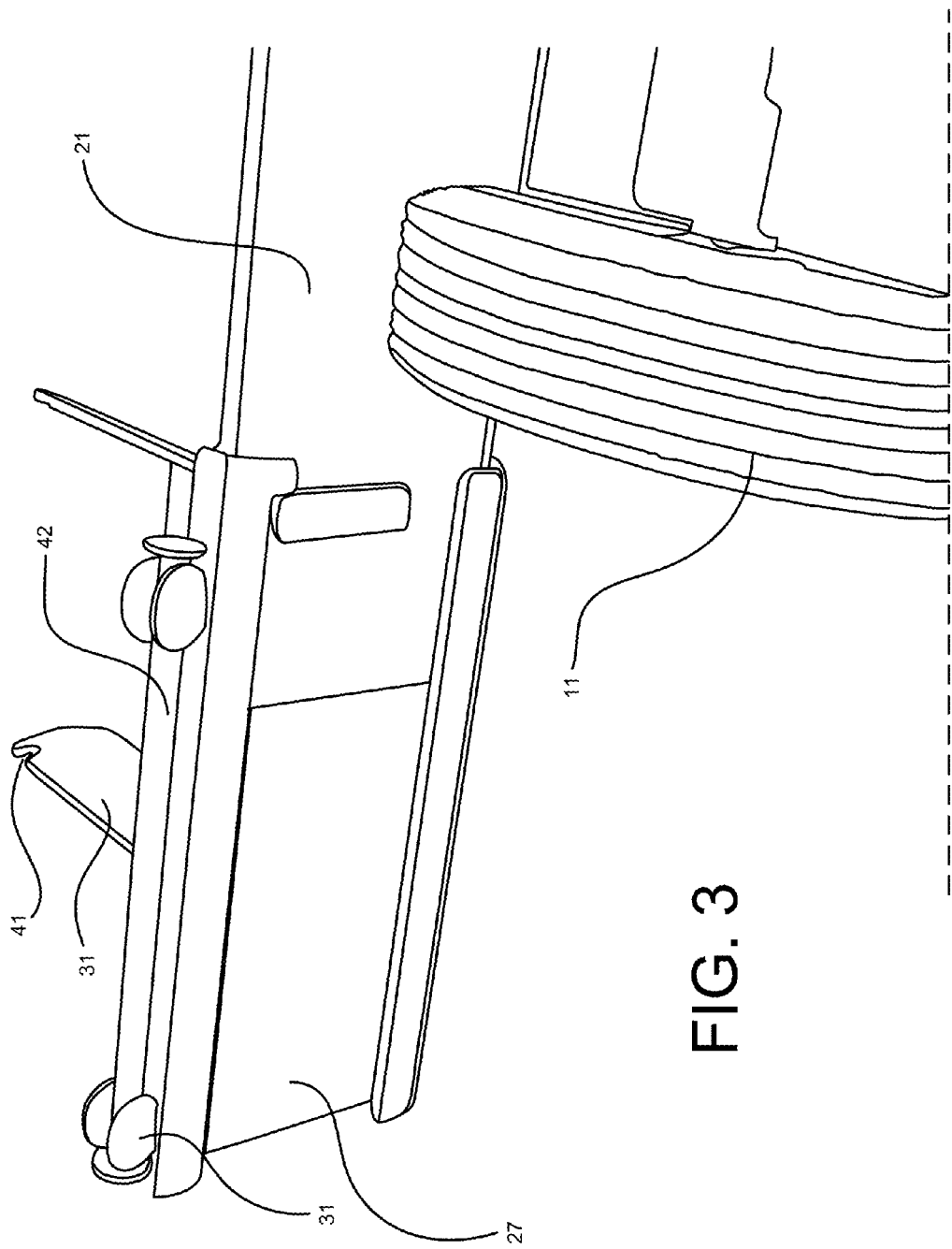
FIG. 3 is a rear view of the lifting device according to an embodiment of the present invention.
Figure 4:
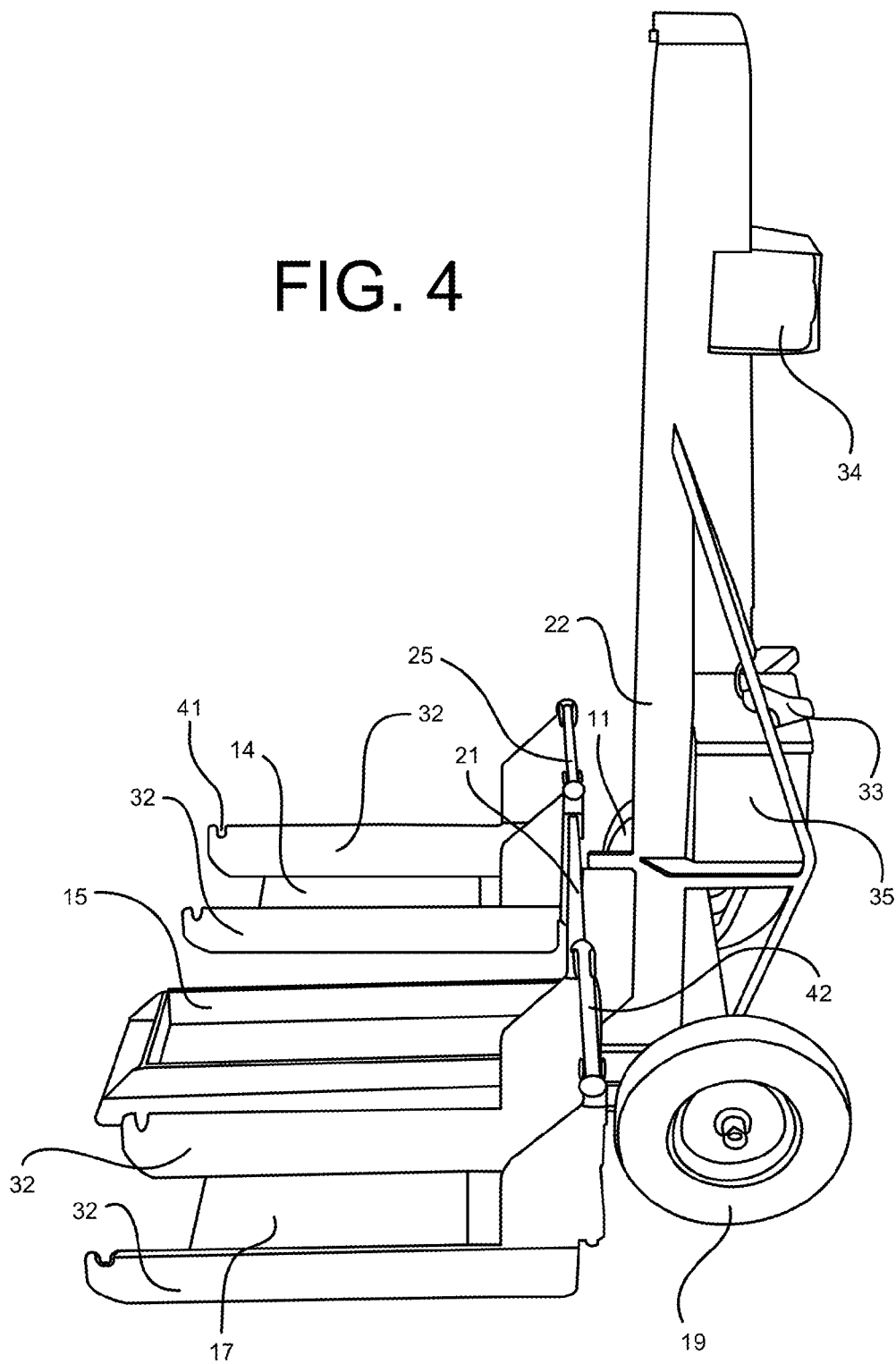
FIG. 4 is a side view of the lifting device according to an embodiment of the present invention.

The following detailed description is of the best currently contemplated modes of carrying out exemplary embodiments of the invention. The description is not to be taken in a limiting sense, but is made merely for the purpose of illustrating the general principles of the invention.

The present invention relates to a device configured to lift the front or rear wheels of small to medium size and weight vehicles such as snow blowers, golf carts or lawn mowers. Lifting the front or back wheels of these vehicles allows inspecting the underside of these vehicles and to make needed repairs such as sharpening or straightening a cutting blade or disassembling the snow blower impeller.

The device comprises two platform assemblies configured for holding and immobilizing the two front or rear wheels. Each of the platform assemblies contains a flat plate configured to slip underneath each of the wheels, two side walls that serve as barrier plates each containing an end notch adapted for placing a barrier rod. The flat plates are maintained substantially parallel with the ground in both the idle and use positions.

The platform assemblies are attached to and are configured to slide horizontally on a horizontal support bar and may be removed off the sides of the support bar. They are free to slide sideways, but have limiters on each side of the horizontal bar that prevents them from sliding off the bar.

The horizontal support bar is attached to a hoist adapted to raise the support bar along with the platform assemblies attached to it when activated. The hoist may be hydraulic or use an electric motor.

The flat plates must be sufficiently thick and hard to withstand the weight of a heavy vehicle without deforming, yet sufficiently thin as to not make it excessively difficult for an average person to slide the plate underneath it. As such, the optimum thickness of the plates ranges from about 0.1 inches to about 0.15 inches and made of hard steel.

A method of use for the device comprises lining up the wheel bracing assemblies with the wheels, sliding the plates of the wheel bracing assemblies under the two front wheels, securing the wheels by placing the rod into the end notch and lifting the wheel bracing assemblies to the desired height which in turn lifts the wheels of the vehicle. In some cases, for example if the floor is irregular or soft and insertion and wedging of the flat plates under the wheels is difficult, alternate pushing of the plates underneath the wheels and activating the hoist to actuate lifting and lowering of the wheels for short distances such as about 0.1 inches to about 0.2 inches may be necessary until the wheel are fully contained within the platform assemblies.

FIGS. 1-6 illustrate the invention and depict the main features and components of the lifting device. The figures show a first flat plate 14 and a second flat plate 17 to be used as platforms on which the vehicle wheels to be lifted are placed. Each plate is part of a wheel bracing assembly; 27 and 29 respectively for the first and second wheel bracing assemblies. The wheel bracing assemblies, 27 and 29, contain front braces 77 and 79 are adapted to slide onto a bracing assembly support bar 21 disposed horizontally. The bracing assembly support bar 21 is attached to a mechanical hoist 22 adapted for engaging the bracing assembly support bar 21 and moving it vertically. The wheel bracing assemblies, 27 and 29, contain side walls 32 that serve as wheel barrier plates that are notched at the rear end. The description here designates the location of the front of the wheels and the rear end designates the location of the rear of the wheels. Barrier rods 25 and 42 are placed into the notches 41 after the flat plates 14 and 17 are positioned under the vehicle wheels to prevent the wheels from moving. The flat plates 14 and 17 are maintained substantially parallel with the ground in both the idle and use positions.

When not in use, the barrier rods 25 and 42 are stored on the top of the wheel bracing assemblies, 27 and 29. Holders 31 for the barrier rods, 25 and 42, keep them in place. The device also comprises a stabilizing ballast 15 to maintain balance and prevent tip overs. The device comprises two wheels, 11 and 19, to enable ground movement. The device may be powered by a battery, 35; however AC power also falls within the scope of the present invention. Also shown are a control box 34 and hand controls 33.

Figure 5:
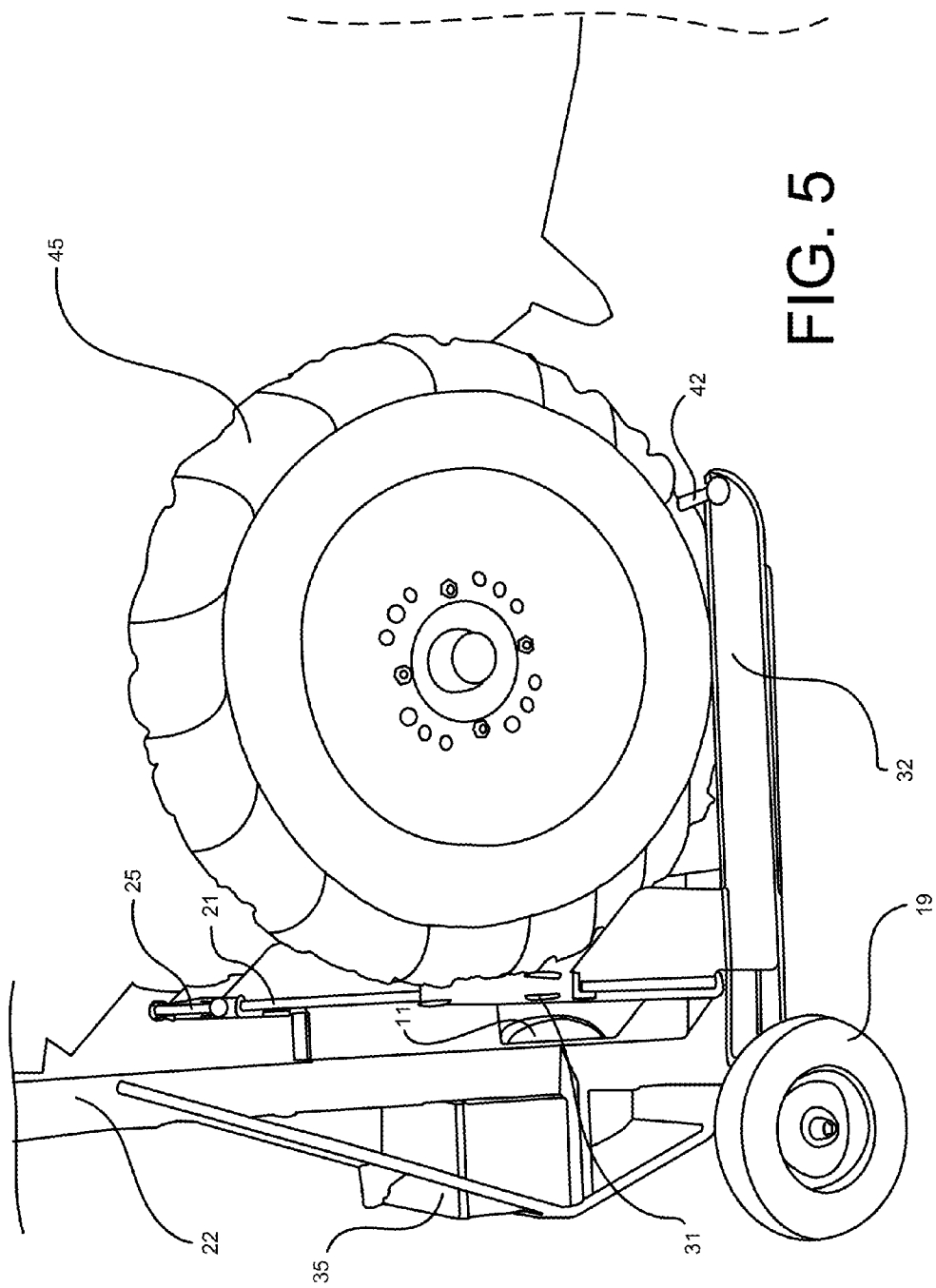
FIG. 5 is a side view of the lifting device in a ready to use position according to an embodiment of the present invention.
Figure 6:
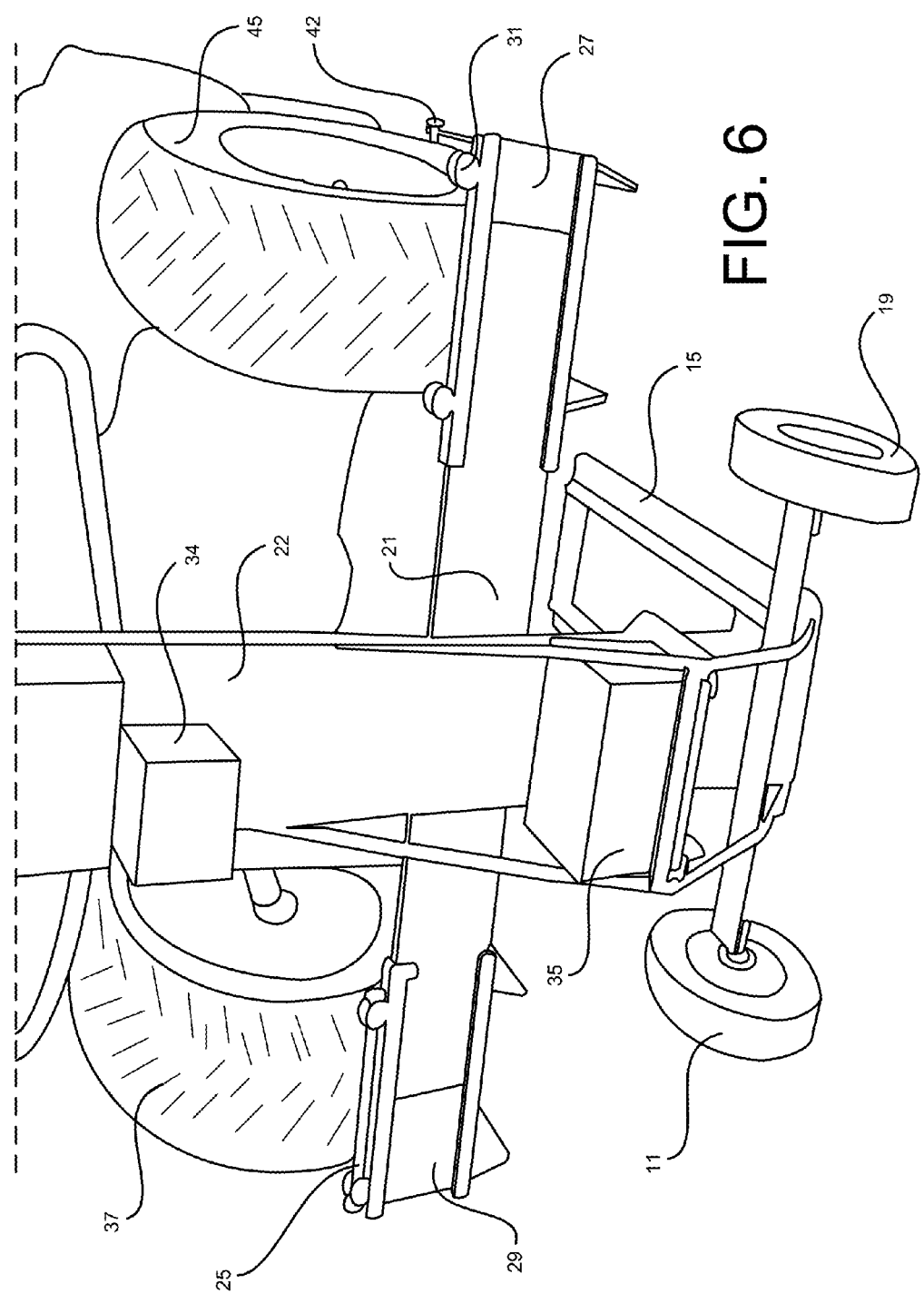
FIG. 6 is a rear view of the lifting device in use according to an embodiment of the present invention.

The device in use is shown in FIGS. 5 and 6 showing the wheels of the vehicle, 37 and 45, mounted onto the platforms.

The method for lifting the vehicle wheels comprises four simple steps:
1. Adjusting the wheel bracing assemblies to line up adjacent with the vehicle wheels.
2. Maneuvering the device such that each of the flat plates is pressed underneath its corresponding wheel. This may be accomplished by exerting a force by a person or by mechanized means. Alternatively, the vehicle wheels may be driven onto the plates of the wheel bracing assemblies.
3. Bracing the wheels by placing the barrier rods in the slots behind the vehicle wheels.
4. Activating the lifting device to lift the vehicle wheels.

It should be understood, of course, that the foregoing relates to exemplary embodiments of the invention and that modifications may be made without departing from the spirit and scope of the invention.

We claim:

1. A device for lifting and holding two parallel vehicle wheels off a floor comprising:
a first platform assembly and a second platform assembly, said first platform assembly and said second platform assembly each containing a flat plate, a front brace, a first side wall and a second side wall, wherein a rear portion of said first side wall comprises a notch and a rear portion of said second side wall comprises a notch, said flat plate having a uniform thickness;
a support bar disposed in parallel with the floor, said first platform assembly and second platform assembly being attached to the support bar in a manner that said first platform assembly and second platform assembly are being configured for horizontal and sideways sliding only movement on said support bar, said first platform assembly and second platform assembly also being configured for positioning and repositioning on said support bar;
said sideways sliding movement of the first platform assembly and the second platform assembly being configured to adjust a distance between the first platform assembly and the second platform to line up with vehicle wheels respectively,
said first platform assembly being adapted for containing only one vehicle wheel and said second platform assembly being adapted for containing only one vehicle wheel;
said flat plate being configured for lifting and holding a vehicle wheel, said flat plate also being configured for wedging between the wheel and the floor, said wedging being accomplished by using sufficient force on the device as to insert said flat plate between the wheel and the floor, said flat plate being configured only for movement parallel to the floor;
said notch being adapted to hold a barrier rod for preventing the wheel from shifting off the plate;
a hoist member for lifting the support bar upward and lowering said support bar to the floor; and
a power supply for the hoist member.

2. The device of claim 1, further comprising a stabilizing ballast for preventing the device from tipping off balance.

3. The device of claim 1 wherein the thickness of each flat plate ranges from about 0.1 inches to about 0.15 inches.

4. The device of claim 1 wherein a material of construction of each flat plate is steel.

5. A method of lifting and holding two parallel vehicle wheels using a device comprising:
a first platform assembly and a second platform assembly, said first platform assembly and said second platform assembly each containing a flat plate, a front brace, a first side wall and a second side wall, wherein a rear portion of said first side wall comprises a notch and a rear portion of said second side wall comprises a notch, said flat plate having a uniform thickness; a support bar disposed in parallel with the floor, said first platform assembly and second platform assembly being attached to the support bar in a manner that said first platform assembly and second platform assembly are being configured for horizontal and sideways sliding only movement on said support bar, said first platform assembly and second platform assembly also being configured for positioning and repositioning on said support bar; said first platform assembly being adapted for containing only one vehicle wheel and said second platform assembly being adapted for containing only one vehicle wheel; said flat plate being configured for lifting and holding a vehicle wheel, said flat plate also being configured for wedging between the wheel and the floor, said wedging being accomplished by using sufficient force on the device as to insert said flat plate between the wheel and the floor, said flat plate being configured only for movement parallel to the floor; said notch being adapted to hold a barrier rod for preventing the wheel from shifting off the plate; a hoist member for lifting the support bar upward and lowering said support bar to the floor; and a power supply for the hoist member;
said method comprising:
maneuvering said device in a manner that the rear portion of the side walls face the wheels to be lifted;
aligning each platform assembly in front of a corresponding wheel by moving said each platform horizontally on the support bar;
with the flat plates in parallel position with the floor, horizontally pushing the device toward the wheels in a manner such that each flat plate is wedged underneath its corresponding wheel and each wheel is contained within its corresponding flat plate;
placing each barrier rod in the respective notch on the rear end of the first side wall and second side wall of each platform assembly; and
activating the hoist to lift the platform assemblies along with the wheels to a desired height and holding the wheels at said height as needed.

6. The method of claim 5 further optionally comprising:
after pushing the device toward the wheels, activating the hoist to lift the wheels a short distance;
further pushing the device in such a manner as to enable each flat plate to further wedge under its corresponding wheel;
activating the hoist to lower the support bar to the floor; and
continuing alternating pushing the device, lifting the support bar with the hoist, pushing the device and lowering the support bar until each wheel is fully contained within its corresponding flat plate.

* * * * *